United States Patent [19]

Wolf

[11] 4,231,688
[45] Nov. 4, 1980

[54] APPARATUS FOR CLEARING SILAGE OR SIMILAR MATERIAL

[76] Inventor: Johann Wolf, A-4644 Scharnstein, Austria

[21] Appl. No.: 876,242

[22] Filed: Feb. 9, 1978

[30] Foreign Application Priority Data

Mar. 7, 1977 [DE] Fed. Rep. of Germany ....... 2709850

[51] Int. Cl.² ............................................. B65G 53/40
[52] U.S. Cl. ..................................... 406/76; 198/737
[58] Field of Search ........................... 302/11, 37, 56;
214/17 DB; 198/737, 740; 414/313, 314, 318;
406/76, 80, 81

[56] References Cited

U.S. PATENT DOCUMENTS

| | | | |
|---|---|---|---|
| 1,532,022 | 3/1925 | Bamford et al. | 198/737 |
| 2,756,112 | 7/1956 | Knutson | 302/56 |
| 3,363,785 | 1/1968 | Kucera | 214/17 DB |
| 3,462,199 | 8/1969 | Harris et al. | 302/56 |

FOREIGN PATENT DOCUMENTS

1139438 11/1962 Fed. Rep. of Germany ..... 214/17 DB

*Primary Examiner*—Jeffrey V. Nase
*Attorney, Agent, or Firm*—Schwartz, Jeffery, Schwaab, Mack, Blumenthal & Koch

[57] ABSTRACT

Disclosed is an apparatus for clearing stored material, such as silage, from a stack of such material, comprising a cantilevered frame; at least one crank rod carried by the frame and having milling tools mounted thereon which engage and clear the stored material; a cranking mechanism mounted on the frame and having the crank rods eccentrically mounted thereon in such a manner that the crank rods are driven with a reciprocating movement such that the milling tools have a lower, silage-engaging path of travel in one direction, and a higher return path of travel in an opposite directional and means for driving the cranking mechanism. In one preferred embodiment, the apparatus further comprises a conveyor means, such as a suction fan, and is particularly suitable for use in discharging silos.

38 Claims, 7 Drawing Figures

APPARATUS FOR CLEARING SILAGE OR SIMILAR MATERIAL

BACKGROUND OF THE INVENTION

Broadly, the present invention relates to an apparatus for clearing stored material, such as silage, from the top of a stack of such material. The present invention particularly relates to an apparatus for extracting silage from the top of a silo container having a round cross-section, which comprises a discharge or clearing means which extends from the marginal region of the silo to its central region and is carried by a cantilever device or boom supported on the silage and rotatable about the vertical silo axis, a projection or suction fan or blower for conveying the cleared silage from the silo, and a motor drive.

Apparatus for clearing stored material from the top of a stack of such material should as far as possible be capable of being used with all types of feed stuffs, such as chopped grass, maize, and other short-cut material, without having to make modifications in the discharge or clearing means. The density of the stored material differs according to the grade or quality thereof, and the cohesion or the bonding of the individual parts of the material with one another is largely dependent on the cut length of the material. More especially stored grass or other dried silage, which is introduced with the short-cut type loaders which are being increasingly used, is strongly intertangled, since the crop, in this type of harvesting procedure, is cut in irregular lengths. Such types of feeding stuffs cannot be satisfactorily discharged with conventional discharge apparatus. These devices have a much too low discharge capacity. An additional problem is that they detach the crop or material irregularly from the stack of feeding stuff, as a result of which clogging effects frequently occur.

One group of the known top-extraction devices has a cantilever device or boom, on which is arranged a revolving chain which is fitted with milling tools. This milling chain revolves in such a way that its bottom run facing the stack or pile of silage is moved towards the centre of the silo, so that the feed is detached from the stack or pile and is transported towards the middle, from which it is thereafter removed. Such top-extraction devices with a revolving milling chain, however, have the disadvantage that the silage, and other short-cut material, is not sufficiently detached from the pile. The regularly revolving milling tools comb out the material still connected to the pile in such a way that it is no longer collectible by the following tools. Moreover, portions of the material are detached in the form of flat layers without being sufficiently distributed, as a consequence of which clogging effects occur, expecially at the inlet to the fan or blower. These known devices accordingly have a low output efficiency and show a great tendency for disruptions.

Another group of top-discharge devices is also known, which use one or two screw conveyors for the clearing and further transport of the silage, said conveyors being provided with tools on their circumference. The upper side of these screw conveyors is enclosed by a casing, so that the discharged material can be carried away. The tools detach and separate the material from the pile or stock and the screw conveyor blade or blades transport the said material towards the center, from which it is ejected or extracted by suction.

However, these top-extraction devices also exhibit the disadvantage that they are not well suited for clearing or carrying away short-cut material provided by loaders. The milling tools comb the adhering material in a circumferential direction and the worm or screw conveyor blades are not able to pick it up or carry it away. The material is only carried away in very small quantities and in a very irregular manner, depending on the cohesion of the separate portions of the material. The engaging action of the milling tools during the subsequent revolving of the milling boom is impaired from time to time, as a result of which the output yield is also further reduced.

SUMMARY OF THE INVENTION

Accordingly, it is an object of the invention to provide a device for extracting silage from the top of a silo and more especially to provide a discharge or clearing means which is employed in the said device, which avoids the disadvantages of the known arrangements and which is able to clear all types of material, even the badly tangled shortcut material from loaders, in a uniform manner and with a high efficiency.

According to the invention, this object is achieved in connection with a device of the type as initially referred to by provision of a discharge or clearing means which comprises at least one push or crank rod which carries silage-engaging tools, which rod or rods is or are mounted eccentrically on a cranking mechanism in such a manner that the crank or push rods are driven with a reciprocating movement such that the milling tools have a lower path of travel in one direction of push rod movement wherein the silage is cleared, and a higher path of travel in an opposite direction of push rod movement wherein the tools are returned to a position suitable for further clearing of stored material.

Due to the eccentric mounting of the ends of the push rods, the tools which are fixed on said rods and which project downwardly are guided along enclosed paths. The geometrical dimensions of the total discharge means are so designed that the bottom ends of the tools penetrate at least along a part of the lower half of their path of movement into the silage. After the said tools have come into engagement with the surface of the silage and during a part of their continued movement, they are introduced to an even greater depth into the silage and are thereafter lifted again. Consequently, they carry out a movement which is similar to the guiding of a hay fork or manure fork by a person. When the tools are once again lifted, the silage which depends from them is not only transported in the direction towards the middle of the silo, but is at the same time also lifted slightly. In this way, the portion of the silage which is connected to the tools is detached from the remainder of the silage.

The advantage which is accrued by the invention results from the fact that individual portions of the silage are not only moved in the direction towards the middle of the silo, but are also lifted and are thereby detached from the remaining silage. In this manner, any combing out of the surface of the silage, such as always occurs with the known clearing apparatus arrangements, is effectively prevented. Furthermore, this arrangement has the advantage that, likewise based on the described movement of the tools along self-enclosed paths, it detaches individual portions of silage from the surrounding silage and also removes it from the tool itself, namely, while this tool is moved back upwardly and rearwardly. The result thereby achieved is that over-sized, coherent portions of silage are prevented from being transported to the suction opening of the suction or exhaustion fan or blower and clogging the latter, such as occurs fairly frequently with the known extraction arrangement.

Preferably, two or more push rods may be provided. These push rods can be arranged offset in phase relatively to one another. They are advantageously arranged offset from one another by equal angular spacings.

The tools with which the push rods are fitted can be constructed as simple tines, as forks with two or more tines, as cutting members and/or as tearing members. The nature of the tools which are to be used depends on the nature of the silage to be cleared and the degree to which it is matted.

According to a further development of the invention, the individual tools can be made with different lengths. They may also be arranged at different intervals from one another on the push rods. They are preferably arranged at progressively smaller distances from one another in the direction towards the wall of the silo. This last-mentioned arrangement is particularly expedient, because a clearing surface or area increasing with the square of the distance is provided as the distance from the center of the silo increases.

According to another development of the invention, the tools are fixed on the push rod at an angle to the latter. If these tools respectively comprise several downwardly projecting tines, tearing members, or cutting members, then according to the speed of circulation of the discharge or clearing means, they may be so arranged that each downwardly projecting tool member, as it engages the silage, takes up exactly that portion of material which has been picked up and carried away during the preceding operational step of the tools by one member of the same or of another tool.

The spacing width of the members of the individual tools from one another, the spacings of the tools from one another on the push rod, and also the angular arrangement of the tools relative to the push rods, which are necessary for this conveying operation as described, is obviously also dependent on the speed at which the clearing or discharge arrangement revolves about the center of the silo.

A similar effect, which is in fact that the portion of material which is conveyed with one passage of the crank by one member or one tool, is taken up during the next or subsequent passage of the crank by a predetermined different member or tool, can also be produced by predetermined offsetting of the tools on a push rod in relation to the arrangement of the tools on the other push rod or rods.

The outermost tools are designed as powerful tearing tools and are angled outwardly towards the wall of the silo such that they sweep over the said wall.

In accordance with another, advantageous development of the invention, the tools are detachably fixed on the push rods. This further development makes it possible, depending on the silage which is to be cleared, to use the tools which are best suited for the purpose and to arrange them on the push rods.

The push rods themselves are fixed on a cranking mechanism such as crank discs or crank shafts. The crank discs advantageously comprise devices for fixing the push rods at different, radial intervals from the center of the crank discs. By this arrangement, it becomes possible for both the depth of penetration of the tools into the silage and also the path of movement of the bottom ends of the tools themselves to be varied. In fact, if the ends of the push rods are arranged with a small radial spacing from the center of the crank disc, then the bottom ends of the tools or their members carry out circular movements with a smaller radius of curvature than if the ends of the push rods were fixed with a larger radial spacing on the crank discs.

It is also possible for a push rod which is in a leading position in the direction of rotation to be fixed on the crank discs with their ends at shorter radial intervals from the centers of the said discs than the next following push rod. If tools of equal length are used on both push rods, then the tools of the push rod which follows in the direction of rotation penetrates into the silage to a greater depth and also over larger radial widths.

Advantageously, in one constructional form of the invention, the crank discs are arranged in a plane which corresponds approximately to the radius of the silo. The crankshafts which are used as an alternative would then be arranged perpendicularly of the radius.

Stripper devices are preferably provided in the region of the tools or the members thereof, which devices may at the same time also be formed as supports.

Supporting surfaces, supporting wheels and/or supporting rollers and/or driving rollers are provided which may also be adjustable in their height relatively to the boom and be capable of being secured in different positions. As a consequence, it is possible for the push rods to slope relatively to the surface of the silage.

According to another preferred embodiment of the invention, two or more push rods are mounted by their ends and by means of universal joints in two crank discs which are arranged obliquely thereof but parallel to one another. This arrangement can be designed as a thrust crank drive, which is driven by the crank disc facing the fan or blower. However, the driven crank disc is preferably offset laterally from the suction opening of the blower or of the suction pipe. The outer crank disc may with advantage be designed as a milled disc of larger diameter which encloses an angle smaller than 90° with the tangent to the silo wall in the direction of rotation of the boom or appliance. Furthermore, the outer crank disc may assume a leading position in the direction of the rotational movement of the device relatively to the inner crank disc.

The driving of the inner crank disc may be derived via an intermediate gearing from the horizontal or vertical or inclined blower shaft.

This clearing or discharge apparatus operates in a manner similar to that of a pusher cranked rake; the working tools are moved in accordance with a resultant, the components of which are firstly directed approximately towards the middle of the stack of material and secondly in the direction of rotation of the apparatus. The cleared material accumulates to form a swath which becomes larger in the direction towards the center of the stack of fodder and which is supplied from the inner crank disc positively to the opening of the blower. In order to improve this positive feeding action, the inner crank disc may be provided on the circumference with resilient tines. This arrangement is also suitable for the clearance or discharge of thin layers with a rapid feeding action or a rapid revolving action of the discharge arrangement, so that also badly tangled and compressed material can be continuously discharged.

As is known, the rotational movement of the apparatus may be provided by one or more driven rollers. The apparatus is in this embodiment suspended at the point of rotation, and is adjustable by means of a cable system or by means of a supporting surface or a supporting mandrel which is adjustable as regards height.

When two driven rollers are provided, it is advantageous for them to be mounted in a common frame and for this frame to be linked for rocking movement on the said apparatus. So as to be able to suitably adapt the clearance height to the type of material, the feed rollers are adjustable in their height relatively to the line of engagement of the working tools.

The conveyor means may comprise a fan or blower which can be arranged vertically with a suction pipe as a suction blower, or as a projection blower with an approximately horizontally arranged blower shaft. However, what is essential with all constructional forms is the coordination of the blower or the suction pipe. This must be so arranged that the material is positively fed from the push rods and the tools into the opening of the projection blower or into the suction opening, so that any clogging effects in the transitional zone are avoided.

The rotational drive can be effected by means of a self-contained geared motor or may also be derived via a distribution gear from a central drive means.

With one arrangement of the projection blower having an approximately horizontal blower shaft, a particularly advantageous development of the driving means is provided by the fact that the blower shaft is connected through an intermediate gearing to the thrust crank driving means and the outer crank disc is connected through another intermediate gearing to the drive roller, in the manner which is hereinafter more fully described by reference to the Figures.

The driving of the separate members, such as the blower, crank drive, and drive rollers, is preferably effected by means of one or more electric motors, the supply of current being effected by means of slip rings in the rotatable mounting of the non-revolving discharge bend or elbow.

The scope of the present invention also extends to the clearing or discharge means by itself. The instant clearing means, such as may also be used in the apparatus as described above for the extraction of silage from the top of a silo, is also suitable quite generally for the clearance of stored material of filamentary or strand-like material, more especially for the clearance of stored stalk-like or stem-like material. This clearing or discharge apparatus is thus also suitable in a quite particular manner for clearing, for example, heaps of manure.

For this purpose, the said clearing arrangement can be fixed on a crane, which is movable on rails which are arranged alongside the said heap of manure.

The clearing arrangement should in this case preferably be fixed for adjustment in height on the said crane.

If the clearing arrangement is to be used for clearing manure from a cowshed, it may be capable of being moved with the assistance of supporting and driving rollers directly on the manure.

It is obvious that such a clearance apparatus is also suitable for clearing or discharging freely stored hay or other loose material.

The use of such or similar clearing apparatus for the discharge of cellulose or other similar material, for the discharge of cotton, in connection with the treatment of refuse, etc., also comes within the scope of the invention.

Other advantages and features of the instant discharge or clearance apparatus will become apparent from the subsidiary claims, taken in conjunction with the drawing and the specification.

The invention is hereinafter more fully described by reference to a number of constructional examples and by reference to the drawing, wherein:

DETAILED DESCRIPTION OF THE PREFERRED EMBODIMENT

Figure 1:
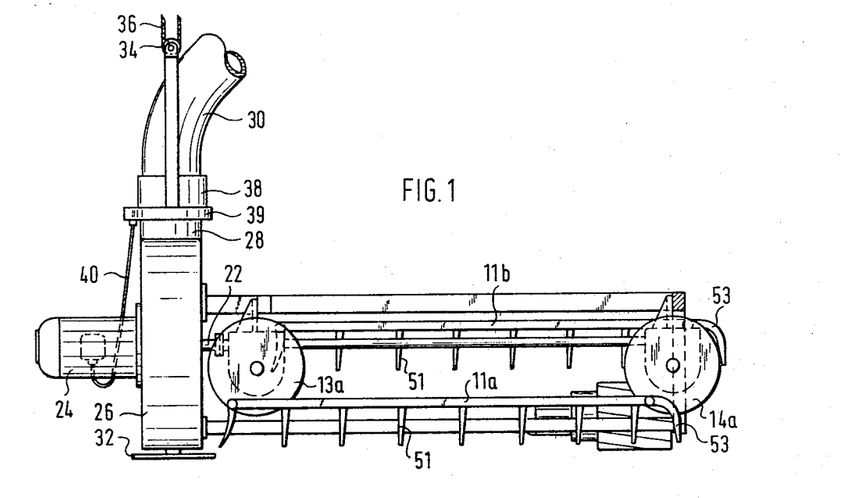
FIG. 1 is a side elevation of one constructional example, having two push rods offset relatively to one another by 180° and a drive means disposed therebetween.
Figure 2:
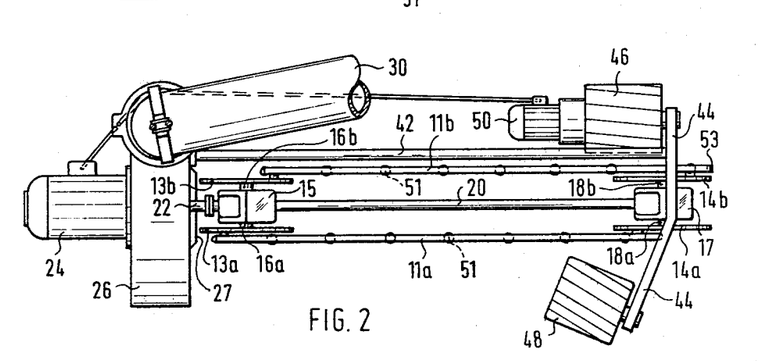
FIG. 2 is a plan view of the constructional example shown in FIG. 1.

Illustrated in FIG. 1 is an embodiment which contains two push rods 11a and 11b. These push rods are respectively connected at their forward end facing the center of the silo to a crank disc 13a and 13b, which are of the same diameter and are arranged coaxially of one another. (see also FIG. 2). In the region of their ends facing the wall of the silo, the two push rods 11a and 11b are connected to a crank disc 14a and 14b, respectively, which likewise are of the same diameter and are arranged coaxially of one another. Both on the inner crank discs 13a and 13b and on the outer crank discs 14a and 14b, the ends of the crank rods 11a and 11b are offset from one another by 180°.

Arranged between the inner crank discs 13a and 13b is a gearing 15, which drives the crank disc 13a through a shaft 16a and drives the crank disc 13b through an opposite shaft 16b.

Located between the outercrank discs 14a and 14b is a gear box 17, from which driving shafts 18a and 18b extend laterally, the said shafts driving the crank discs 14a and 14b, respectively. Both gear boxes 15 and 17 are interconnected by a shaft 20. This long shaft is driven by a driving shaft 22 of the motor 24, which at the same time operates the suction or projection fan or blower. Together with the motor 24, the said fan or blower consists essentially of a suction box 26, a vertical pipe 28, and a curved pipe 30 which extends out of the silo. The said fan or blower rests along the vertical axis of the silo on the silage by means of a supporting plate 32, relatively to which the suction box 26 and the vertical pipe 28 are rotatable. This fan or blower can be lowered by means of a lowering pulley 34 and with the aid of a rope or cable 36. The curved pipe 30, which projects from the silo through a window, should obviously not be rotated when the silage is extracted. Accordingly, it is rotatably connected to the vertical pipe 28. The electrical connection of the motor to the main supply is by way of current collectors 38 and 39 and a cable 40.

The discharge means, which consists essentially of the push rods and the crank discs, is carried by a frame 42, which is rigidly connected to a bent cross member 44, on the ends of which are rotatably mounted drive rollers 46 and 48, which rest on the stack of fodder. Preferably the cross member 44 is mounted on the frame 42 so as to be rotatable thereon.

The drive roller 46 is driven by a motor 50, while the drive roller 48 runs idly.

The diameters of the drive rollers 46 and the arrangement thereof on the bent cross member or girder 44 are so devised that the crank discs 14a and 14b and the push rods 11a and 11b are always situated above the silage, even when the two crank discs 14a and 14b are driven by the fan motor 24 through its shaft 22 and also the shaft 20. While the crank discs 14a and 14b are driven, the motor 50 drives the drive rollers 46 and 48, so that this discharge device constructed as a cantilever or boom rotates about the supporting plate 32 and the vertical pipe 28.

Fixed on the push rods 11a and 11b are downwardly projecting tools 51, which are represented in a strictly diagrammatic manner in the Figure as pins or tines. Tools 53, which are angled out towards the silo wall, are fixed on the rearward ends of the push rods.

If only the crank discs 13a, 13b and 14a, 14b are driven, the bottom ends of the tools 51 and 53 carry out circular movements. If the two pairs of crank discs 13a, 13b and 14a, 14b are of the same diameter and the ends of the push rods are always fixed at the same distance from the center point of the pairs of crank discs, the bottom ends of the tools carry out circular movements with the same radius of curvature as the pairs of crank discs.

These tools 51 and 53 are of such dimensions that they penetrate into the silage on the lower half of their circular path or at least on a part of the lower circular path, during which they possess a movement component away from the silo wall approximately to the center of the silo. consequently, they carry out a movement which proceeds similarly to that which would be carried out with a hay fork or a manure fork. They dig into the silage and lift this upwardly and approximately in a radial direction. Since they lift each portion of silage, while they simultaneously move the said portion in a forward direction, any combing out and thus any alignment of the surface silage material is prevented.

It is pointed out that the tools 51 and 53 have only been represented diagrammatically in this Figure. These tools need not under all circumstances be vertical pins or tines; they may also be tines curved forwardly on their underside or they can be made as cutting and tearing tools. Moreover, these tools can also be made in a fork-like manner, with two, three, or even more tines. These tools may also be made of different lengths, so that they penetrate to different depths into the silage. For example, the tools of the push rod 11b which is trailing in the direction of rotation may throughout be of a different length from those of the leading push rod 11a. The tools of the push rod 11b which is trailing in the direction of rotation may also be so arranged offset in relation to the tools on the leading push rod 11a that they pick up portions of material lifted by the tools of the push rod 11a and carry them further in a radial direction.

When this discharge means is operating, the tools 51 and 53 convey the silage to the suction opening 27, through which it is drawn by suction into the suction box 26, from which it is ejected through the vertical pipe 28 and through the curved short pipe 30.

Figure 3:
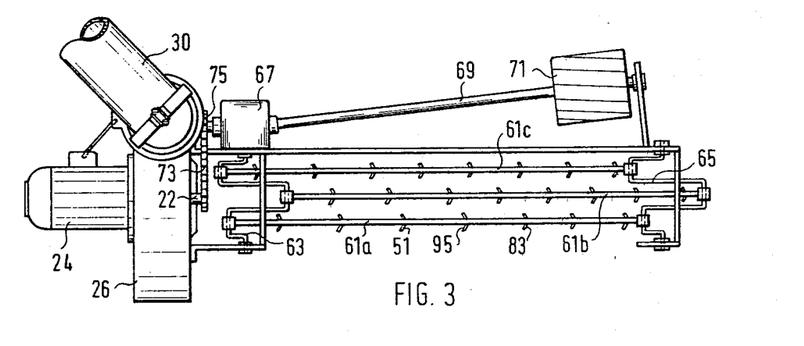
FIG. 3 is a plan view of a constructional example having three push rods, which are driven at one end through a distributor gear which also drives the feed roller.

FIG. 3 shows a plan view of a constructional example having three push rods 61a, 61b, and 61c, which are rotatably mounted at their inner ends on a crankshaft 63 and at their outer ends on a crankshaft 65. As regards the said two crankshafts 63 and 65, it is only the crankshaft 63 which is driven, the drive being in fact from a distributor gear 67, from which the drive roller 71 is also driven through a shaft 69. The driving of both the fan and also of the discharge arrangement and the drive roller, is entirely obtained through the motor 24. The rotational movement of the shaft 22 of the motor 24 is transmitted through an intermediate chain transmission 73 and a gear wheel 75 to the distributor gear 67 which, as already described, drives the crankshaft 63 and also the shaft 69 of the feed roller 71.

Figure 4:
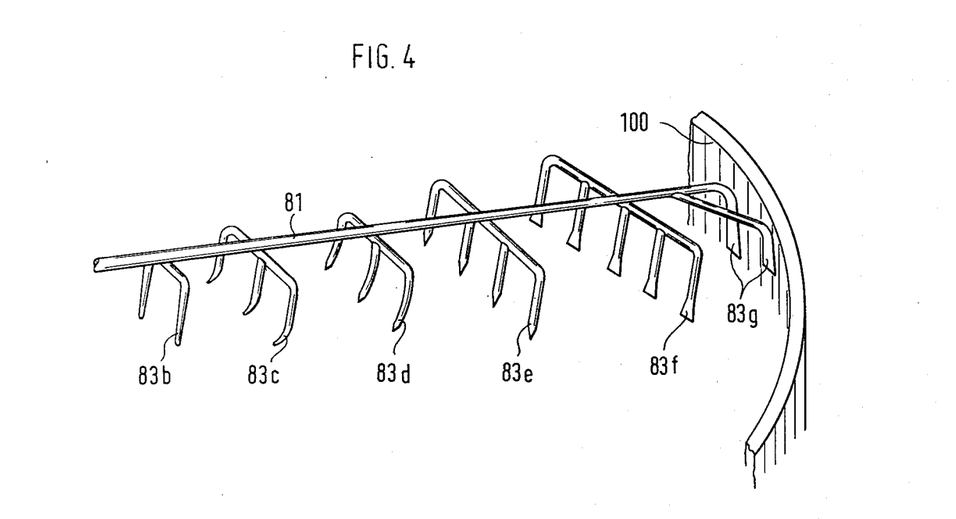
FIG. 4 is a side elevation of a push rod on which are arranged tools which become increasingly wider towards the external wall of the silo and also comprise more tines.

FIG. 4 is a diagrammatic view of a push rod 81, which carries various tools 83b to 83g. As will be seen from this Figure, the tools which are arranged on the outer end of the push rod 81, that is to say, the end closest to the silo wall, are made wider than the tools closer to the center of the silo. This is more expedient, because with an increasing distance from the center of the silo to the wall thereof, larger surfaces have to be swept over by the tools, since the surface increases with the square of the distance from the center of the silo. Accordingly, it is also possible, as represented in FIG. 4, for the tools to be made wider from 83b, i.e. approximately from the central zone of the silo, towards the tools 83f, and also comprise progressively more tines or the like.

It may also be desirable, as indicated in the Figure at 83f, for the individual tines of a tool to be made increasingly larger from the tine which is leading in the rotational movement and is facing the viewer towards the tines at the back in the viewing direction.

Furthermore, it may also be advantageous for the individual tools 83 not to be arranged exactly at rightangles to the push rod 81, but rather at an angle, so that the tines which are trailing in the direction of rotation are at a smaller distance from the center of the silo. In coordination with the speed of rotation of this cantilever or boom, this arrangement may be so devised that, more especially as regards to outermost tools, each of the tines which are trailing in the direction of rotation takes up on its lower path of movement discharging the silage that portion of the silage which has been taken up in the previous engaging movement by the leading tines. On the other hand, also depending on the nature of the silage, it may also be desirable for the different tines of a tool, e.g. of the tool 83f, to be so arranged at such an angle relatively to the push rod 81 that the separate tines of this tool cover or sweep over the total radial range from the tine of the next inner tool 83e closest to the silo wall to the innermost tine of the next outer tool.

As already indicated in this strictly diagrammatic arrangement of FIG. 4, the individual tool need not only have smooth and downwardly pointed tines, but in fact they can also form other cutting and tearing tools.

Figure 5A:
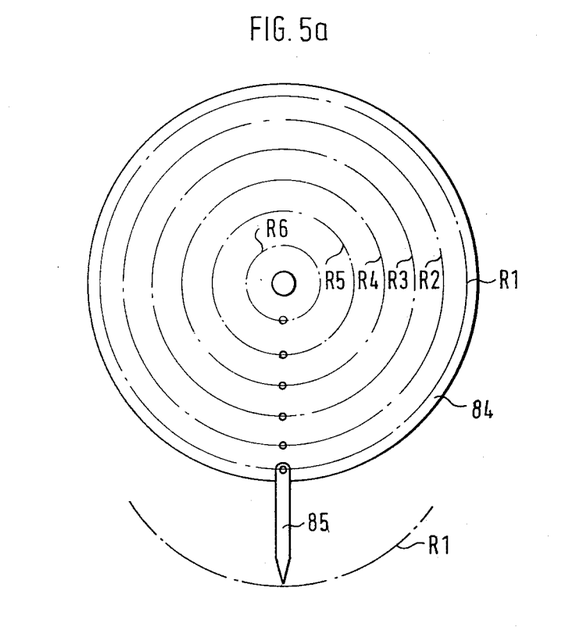
FIGS. 5a and 5b show different circular paths of movement, which illustrate the effect of a change in the length of the crank arm, with respect to the depth of penetration of the tool into the silage and with respect to the radius of curvature of the path of movement.

Represented in a strictly diagrammatic manner in FIG. 5 is a crank disc with a radius R1. A tool 85 is also represented, strictly in diagrammatic form, on the outer rim of this crank disc. This tool 85 is to be so fixed on the crank disc 84 that it always points vertically downwards. The bottom pointed end of this tool 85 thus carries out a circulatory movement which has the same diameter as the crank disc 84, namely, 2×R1. This circle of the bottom point of the tool 85 is, however, offset downwardly relatively to the circumferential circle R1 of the crank disc 84 by the length of the tool 85.

Various circles with the radii R2, R3, R4, R5 and R6 are represented on this crank disc 84.

Figure 5B:
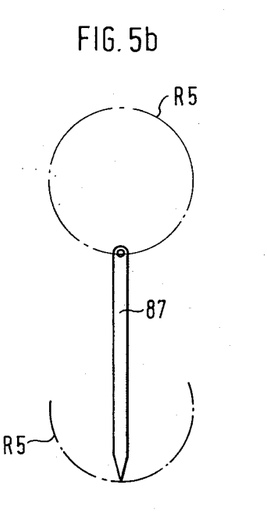

In FIG. 5b, the circle is once again represented with the radius R5. Should a tool 87 be fixed thereon at a distance R5 from the center of the crank disc 84, then this tool 87 would have to be substantially longer than the tool 85, namely, by the amount R1-R5, if its lower point is to dig to an equal depth into the silage.

However, as will be seen from FIG. 5b, the lower tip of the tool 87, during the rotation of the crank disc 84, describes a circle of which the radius of curvature is equal to R5.

This differential movement of the bottom tips of the tools along various circular paths with different radii could also be obtained by the ends of the push rods being arranged at suitably different radial distances from the center point of the crank discs. The smaller the radial spacing from the center of the crank disc, so obviously must the tools be longer if their tips are to engage to equal depth into the silage.

Consequently, it is proposed according to the invention that holes or other means for supporting the ends of the push rods should be formed on the crank discs at different radial spacings from the center point. Furthermore, the holding means for the tools on the push rods are themselves to be so constructed that the person operating the tools can easily remove the latter and fit other tools.

This further development of the invention enables, for example, the tools of the push rod which is leading in the direction of rotation to be guided along circles with smaller radii of curvature than the tools of the push rod or rods which are trailing in the direction of rotation.

This change in the path of movement of the lower tool tips is thus different from that alteration which is obtained by altering the support of the crank discs or of the crankshafts as regards their height.

Figure 6:
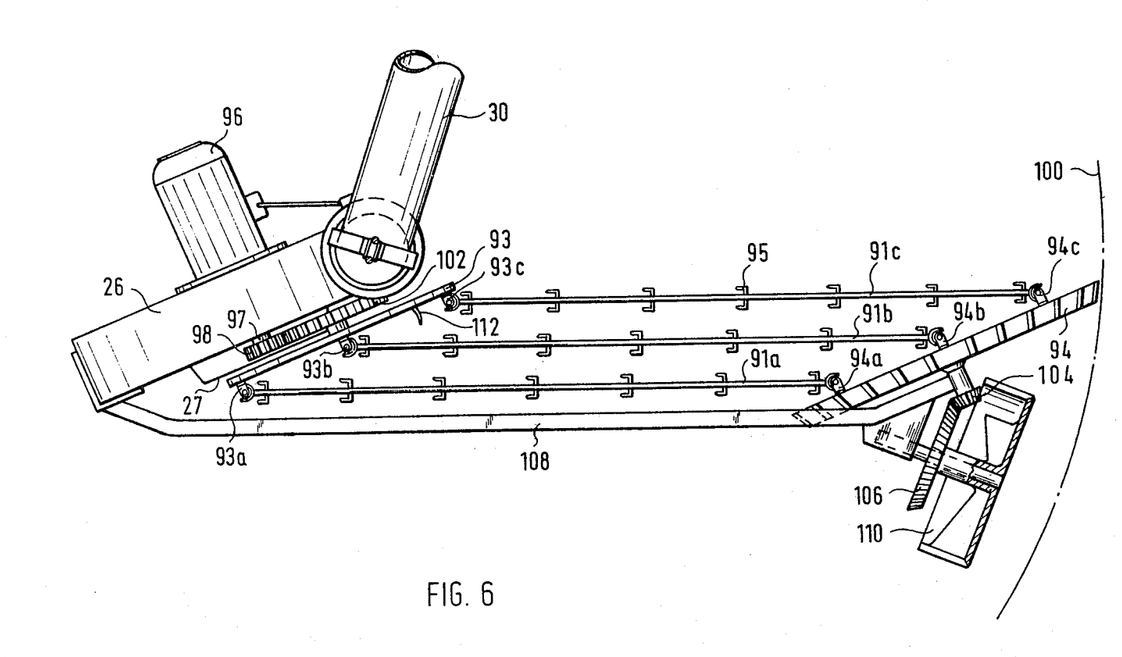
FIG. 6 is a plan view of another constructional example having four push rods, which are fixed on two crank discs which are parallel to one another but at an angle to the push rods.

Another constructional form of the invention is represented in FIG. 6. In this constructional form, at least three push rods 91a, 91b, and 91c are connected via universal joints 93a, 93b, and 93c to a crank disc 93, while their respective other ends are connected through universal joints 94a, 94b, and 94c, respectively, to a crank disc 94. The two crank discs 93 and 94 are arranged parallel to one another, but at an inclination to the push rods 91a, 91b, and 91c. The entire driving arrangement of the said means for extracting silage from the top of the silo is by means of a motor 96, which also drives the fan or blower, and preferably is formed with stepped or decreasing torques. The rotational movement of the shaft 97 of this motor 96 is transmitted through a gear 98 to another gear 102, the shaft of which drives the crank disc 93. This driven crank disc 93 is offset laterally from the suction opening 27 of the blower.

The outer crank disc 94 is driven from the inner crank disc 93 through the push rods 91a, 91b and 91c. This outer crank disc 94 is advantageously formed as a milling disc or larger diameter and at a tangent to the silo wall, which disc, in the direction of the rotational movement of the device, encloses with the latter an angle smaller than 90°. This outer crank disc 94 is able to assume a leading position in relation to the inner crank disc in the sense of the rotational movement of the apparatus. The drive of the inner crank disc 93 is taken off through the intermediate gearing from the horizontal or vertical blower arrangement. The rotational movement of the outer crank disc is transmitted to a drive roller 110 through two bevel gears 104 and 106, of which the first is mounted on frame 108.

This discharge arrangement operates similarly to a cranked rake. The working tools are moved along a resultant, the components of which are firstly directed approximately towards the center of the stack of material, and secondly in the direction of rotation of the appliance. The discharged material is accumulated as a swath which becomes larger in the direction of the center of the stack of feed stuff, and which is fed from the inner crank disc 93 positively to the blower opening 27. For improving this positive feeding movement, resilient tines 112 are fixed on the inner crank disc, only a single tine 112 on the said disc being shown diagrammatically in FIG. 6. This constructional form of the invention is more especially suitable for discharging thin layers with a relatively fast feeding movement of the discharge arrangement, so that also badly matted and consolidated material can be continuously carried away and discharged.

What is claimed is:

1. Apparatus for clearing relatively dense and matted stored material, particularly silage, from a stack of said material, comprising:
   means locatable over a central portion of said stack of material for conveying particles of said material from said central portion upwardly and outwardly of said stack; and
   means for loosening and directing particles of said material from a periphery of said stack surrounding said central portion toward said central portion, comprising:
      at least on frame member cantilevered substantially horizontally at an inner end from said conveying means, said frame member extending radially outwardly from said conveying means; at least two push rods each having tool means extending downwardly for engaging said material;
      driven means for carrying and reciprocating said push rods such that said push rod tool means travel along a closed circular path, lying in a vertical plane parallel to said frame member, having a lower material-engaging path portion in a first direction wherein particles of said material are loosened and drawn toward said conveying means by said tool means, and an elevated path portion in the opposite direction wherein said tool means are returned to a position suitable for re-travelling said lower path portion, said at least two push rods mounted on said push rod carrying means such that said push rods are offset in phase relative to one another by equal angular spacings when reciprocated; and
   means for driving said push rod carrying means;
   said push rod carrying means comprising:
      first and second eccentric cranks at respective ends of said frame member, each said crank comprising a crankshaft having a horizontal axis of rotation fixedly disposed perpendicular to said frame member, each end of each push rod being rotatably mounted at a predetermined distance from the axis of rotation on a respective one of said crankshafts whereby rotation of said crankshafts causes said tool means to travel along said circular path; and means for operatively connecting at least one of said cranks to said driving means; and said conveyor means comprising:

a suction box having a fan within said suction box mounted on a driven shaft and having a suction opening facing said push rods, a vertical pipe section communicating with said suction box and being disposed along a vertical axis through said suction box, and a curved pipe section rotatably mounted on an upper end of said vertical pipe section, said suction opening disposed in a region near the end of said lower, material-engaging path portion of said tool means, the apparatus further comprising a support member adapted to rest upon said stack of stored material, said suction box being rotatably mounted on said support member such that said conveyor means and said cantilevered frame member are rotatable with respect to said stack and said curved pipe section.

2. The apparatus of claim 1, further comprising driven wheel means mounted to an outer end of said cantilevered frame member opposite said inner end, said driven wheel means supporting said cantilevered frame member on said stack of material and rotating said cantilevered frame member about said support member.

3. The apparatus of claim 2, wherein said suction box shaft, said driven wheel means and at least one said crankshaft are commonly driven by said driving means.

4. The apparatus of claim 3, wherein said driving means comprises a motor operatively connected for driving said suction box shaft; and first gear means driven by said suction box shaft for driving one said crankshaft and for driving said driven wheel.

5. The apparatus of claim 2, wherein said push rod tool means comprise forks having tines.

6. The apparatus of claim 2, wherein said push rod tool means have lower ends formed as cutting or tearing members.

7. The apparatus of claim 2, wherein said push rod tool means are of different lengths.

8. The apparatus of claim 2, wherein said push rod tool means comprise plural milling tools arranged at irregular intervals along each push rod.

9. The apparatus of claim 2, wherein said push rod tool means are arranged at an oblique angle with respect to a longitudinal axis of each push rod.

10. The apparatus of claim 2, wherein said push rod tool means comprise plural milling tools having varying numbers of tines or cutting members.

11. The apparatus of claim 2, wherein said push rod tool means comprise plural milling tools on each said push rod, a milling tool disposed furthest from said suction box being angled outwardly away from said suction box and formed as a tearing tool.

12. Apparatus for clearing relatively dense and matted stored material, particularly silage, from a stack of said material, comprising:

means locatable over a central portion of said stack of material for conveying particles of said material from said central portion upwardly and outwardly of said stack; and means for loosening and directing particles of said material from a periphery of said stack surrounding said central portion toward said central portion, comprising:

at least one frame member cantilevered substantially horizontally at an inner end from said conveying means, said frame member extending radially outwardly from said conveying means;

at least two push rods each having tool means extending downwardly for engaging said material;

driven means for carrying and reciprocating said push rods such that said push rod tool means travel along a closed circular path, lying in a vertical plane parallel to said frame member, having a lower material-engaging path portion in a first direction wherein particles of said material are loosened and drawn toward said conveying means by said tool means, and an elevated path portion in the opposite direction wherein said tool means are returned to a position suitable for re-travelling said lower path portion, said at least two push rods mounted on said push rod carrying means such that said push rods are offset in phase relative to one another when reciprocated; and means for driving said push rod carrying means;

said push rod carrying means comprising:

first and second pairs of crank discs at respective ends of said frame member, each said crank disc pair mounted coaxially on a respective shaft for rotation in vertical planes parallel to the plane of said closed circular path, each said shaft having a horizontal axis of rotation fixedly disposed perpendicular to said frame member, a first said crank disc at each end of said frame member lying in a first common plane and a second said crank disc at each end of said frame member lying in a second common plane, each end of each said push rod being rotatably mounted at a predetermined distance from the axis of rotation on a respective one of said crank discs whereby rotation of said crank discs causes said tool means to travel along said circular path; and means for operatively connecting at least one of said crank disc pairs to said driving means; and said conveyor means comprising:

a suction box having a fan within said suction box mounted on a driven shaft and having a suction opening facing said push rods, a vertical pipe section communicating with said suction box and being disposed along a vertical axis through said suction box, and a curved pipe section rotatably mounted on an upper end of said vertical pipe section, said suction opening disposed in a region near the end of said lower, material-engaging path portion of said tool means, the apparatus further comprising a support member adapted to rest upon said stack of stored material, said suction box being rotatably mounted on said support member such that said conveyor means and said cantilevered frame member are rotatable with respect to said stack and said curved pipe section.

13. The apparatus of claim 12, further comprising driven wheel means mounted to an outer end of said cantilevered frame member opposite said inner end, said driven wheel means supporting said cantilevered frame member on said stack of material and rotating said cantilevered frame member about said support member.

14. The apparatus of claim 13, further comprising a roller mounted to said outer frame member end and spaced apart from said driven wheel means, said roller further supporting said cantilevered frame member on said stack of material.

15. The apparatus of claim 13, wherein said driving means comprises a motor operatively connected for driving said suction box shaft; first gear means driven by said suction box shaft for driving said crank discs located nearest said inner frame member end; and second gear means driven by said first gear means for driving said crank discs located nearest said outer frame member end.

16. The apparatus of claim 15, wherein said push rod tool means comprise forks having tines.

17. The apparatus of claim 15, wherein said push rod tool means have lower ends formed as cutting or tearing members.

18. The apparatus of claim 15, wherein said push rod tool means are of different lengths.

19. The apparatus of claim 15, wherein said push rod tool means comprise plural milling tools arranged at irregular intervals along each push rod.

20. The apparatus of claim 15, wherein said push rod tool means are arranged at an oblique angle with respect to a longitudinal axis of each push rod.

21. The apparatus of claim 15, wherein said push rod tool means comprise plural milling tools having varying numbers of tines or cutting members.

22. The apparatus of claim 15, wherein said push rod tool means comprise plural milling tools on each said push rod, a milling tool disposed furthest from said suction box being angled outwardly away from said suction box and formed as a tearing tool.

23. The apparatus of claim 12, wherein said suction box shaft and said crank discs are commonly driven by said driving means.

24. Apparatus for clearing relatively dense and matted stored material, particularly silage, from a stack of said material, comprising:
  means locatable over a central portion of said stack of material for conveying particles of said material from said central portion upwardly and outwardly of said stack; and
  means for loosening and directing particles of said material from a periphery of said stack surrounding said central portion toward said central portion, comprising:
    at least one frame member cantilevered substantially horizontally at an inner end from said conveying means, said frame member extending radially outwardly from said conveying means;
    at least one push rod having tool means extending downwardly for engaging said material;
    driven means for carrying and reciprocating said push rod such that said push rod tool means travel along a closed elliptical path lying in a non-vertical plane oblique to a vertical plane through said frame member, having a lower material-engaging path portion in a first direction wherein particles of said material are loosened and drawn toward said conveying means by said tool means, and an elevated path portion in the opposite direction wherein said tool means are returned to a position suitable for re-travelling said lower path portion;
    means for driving said push rod carrying means and said conveying means; and
    driven wheel means mounted to an outer end of said cantilevered frame member opposite said inner end, said driven wheel means supporting said cantilevered frame member on said stack of material and rotating said cantilevered frame member about an axis;
  said push road carrying means comprising a first crank disc located near said frame member inner end and mounted for rotation in a vertical plane oblique to said vertical plane through said frame member; a second crank disc located near said frame member outer end and mounted for rotation in a vertical plane parallel to said rotation plane of said first crank disc; and universal joints connecting each end of said at least one push rod to a respective one of said crank discs such that driving said first disc causes said second disc to be driven by means of said at least one push rod; said conveying means comprising a suction box having a fan within said suction box mounted on a driven shaft, a suction opening facing said push rod, and an exhaust opening facing upwardly; and
  said drive means comprising a motor for driving said suction box shaft; gear means driven by said suction box shaft for driving said first crank disc, a first bevel gear mounted for rotation with said second crank disc, and a second bevel gear mounted for rotation with said driven wheel means and driven by said first bevel gear.

25. The apparatus of claim 24, wherein three said push rods are mounted between said inner and outer crank discs.

26. The apparatus of claim 24, wherein said conveying means further comprises a vertical pipe section communicating with said suction box and being disposed along a vertical axis through said suction box; and a curved pipe section rotatably mounted on an upper end of said vertical pipe section.

27. The apparatus of claim 24, wherein said suction opening is disposed in a region near the end of said lower, material-engaging path portion of said tool means.

28. The apparatus of claim 27, further comprising a support member adapted to rest upon said stack of stored material, said suction box being rotatably mounted on said support member such that said conveyor means and said cantilevered frame member are rotatable with respect to said stack and said curved pipe section.

29. The apparatus of claim 24, wherein said first crank disc is offset laterally with respect to the suction opening of said suction box.

30. The apparatus of claim 24, wherein said second crank disc comprises a milling disc of larger diameter than said first crank disc.

31. The apparatus of claim 24, wherein said second crank disc is disposed, relative to said first crank disc, such that said second crank disc assumes a leading position upon rotation of said cantilevered frame member by said driven wheel means.

32. The apparatus of claim 24, wherein said push rod tool means comprise forks having tines.

33. The apparatus of claim 24, wherein said push rod tool means have lower ends formed as cutting or tearing members.

34. The apparatus of claim 24, wherein said push rod tool means are of different lengths.

35. The apparatus of claim 24, wherein said push rod tool means comprise plural milling tools arranged at irregular intervals along each push rod.

36. The apparatus of claim 24, wherein said push rod tool means are arranged at an oblique angle with respect to a longitudinal axis of each push rod.

37. The apparatus of claim 24, wherein said push rod tool means comprise plural milling tools having varying numbers of tines or cutting members.

38. The apparatus of claim 24, wherein said push rod tool means comprise plural milling tools on each said push rod, a milling tool disposed furthest from said suction box being angled outwardly away from said suction box and formed as a tearing tool.

* * * * *